United States Patent [19]

Matsumura et al.

[11] Patent Number: 4,504,256

[45] Date of Patent: Mar. 12, 1985

[54] VARIABLE V-BELT

[75] Inventors: Kaname Matsumura, Akashi; Takahiko Komai, Takasago, both of Japan

[73] Assignee: Mitsuboshi Belting Ltd., Kobe, Japan

[21] Appl. No.: 358,051

[22] Filed: Mar. 15, 1982

[30] Foreign Application Priority Data

Mar. 17, 1981 [JP] Japan ................................ 56-33711

[51] Int. Cl.³ .............................................. F16G 5/20
[52] U.S. Cl. .................................... 474/250; 474/153
[58] Field of Search .............. 474/153, 250, 205, 201, 474/260–266, 204, 251, 167

[56] References Cited

U.S. PATENT DOCUMENTS

| | | | |
|---|---|---|---|
| 3,818,741 | 6/1974 | Terhune | 474/262 |
| 3,835,720 | 9/1974 | Fischer et al. | 474/250 |
| 3,863,515 | 2/1975 | Meadows | 474/265 |
| 4,031,768 | 6/1977 | Henderson et al. | 474/250 |
| 4,351,432 | 9/1982 | Ballocci et al. | 474/260 |
| 4,392,842 | 7/1983 | Skura et al. | 474/250 |

FOREIGN PATENT DOCUMENTS 20623  5/1977  Japan .

Primary Examiner—John E. Murtagh
Assistant Examiner—Andrew Joseph Rudy
Attorney, Agent, or Firm—Wood, Dalton, Phillips, Mason & Rowe

[57]  ABSTRACT

A V-belt construction (10) utilizing one or more layers (19) of transverse cord fabrics in the compression section (17) thereof. The fabric cord layers are embedded in cushion rubber provided with short transverse reinforcing fibers and are laid down in a serpentine manner so as to follow the valleys and peaks of the cog portions (16) of the belt, with the layers being spaced apart in the peak portions (22) of the cogs and closely juxtaposed in the valley portions (21) thereof.

8 Claims, 3 Drawing Figures

VARIABLE V-BELT

BACKGROUND OF THE INVENTION

1. Field of the Invention

This invention relates to the construction of raw-edge, variable power transmission V-belts with the width of the top surface thereof being greater than the height thereof.

2. Description of the Background Art

V-belts require high resistance to lateral pressure since they transmit power to the cooperating pulleys by a "wedge effect". Particularly high resistance to lateral pressure is required where the V-belt has a wide top surface. Various attempts have been made in the prior art to enchance the lateral pressure resistance. Such attempts have been directed to reinforcing the portion of the belt under the compression section.

Illustratively, one such prior art belt was constructed with a plurality of short fibers embedded in transverse orientation between the load-carrying section and the reinforcing member under the compression section. Such belts, however, were found to be unsatisfactory in that wear and cracking of the compression section occurred due to friction with the pulley. Further, such belts were subject to peeling separation of the tension cords and compression section due to stresses concentrated in the portion under the compression section during belt inflection. Further, when used with small diameter pulleys, such belts were found to be less inflective, and the portion under the compression section was significantly heated causing degradation of the compression section.

Another attempt to provide improved lateral pressure resistance and inflective characteristics is illustrated in Japanese Utility Model Publication No. 1977-20623. As disclosed therein, the V-belt is arranged with cogs in the bottom portion thereof. Fabrics are embedded in the cogged area, the fabrics being impregnated with natural fiber, rubber, synthetic resin, or the like. Although such a cogged V-belt provides some improved resistance to lateral pressure due to the embedment therein of said fabrics, such belts have been found to be too hard and inflexible for long trouble-free life.

SUMMARY OF THE INVENTION

The present invention comprehends an improved belt construction effectively eliminating the above-discussed problems of the prior art V-belts and cogged belts.

In one form of the invention, a belt is provided with a cogged bottom portion having embedded therein one or more layers of tire cords arranged laterally and extending serpentinely longitudinally of the belt.

Another feature of the invention comprises the provision of a plurality of short fibers embedded laterally between individual tire cord layers and in the cogged portion. Such belt constructions cause the lateral pressure resistance to be uniform throughout the cogged portion and allow dispersion of stresses which are otherwise concentrated in the tire cord during belt inflection, thereby preventing wear and cracking of the short fibers, i.e. Stiflex, extending between the tire cord. Such V-belts provide highly improved lateral pressure resistances and inflection characteristics.

The belt construction of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
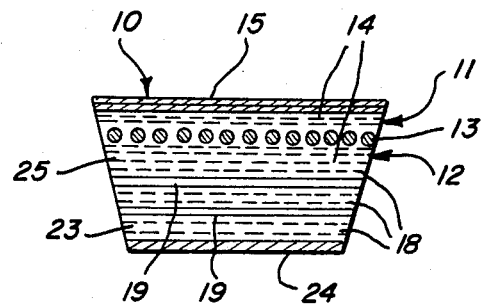
FIG. 1 is a transverse cross section of a cogged, variable V-belt embodying the invention.

In the illustrative embodiment of the invention as disclosed in the drawing, a V-belt generally designated 10 includes an upper cushion layer 11 and a lower cushion layer 12 with tensile cords 13 extending longitudinally of the belt embedded therebetween.

The cushion layers 11 and 12 are formed of a resilient material, such as rubber, and in the illustrated embodiment, are formed of natural rubber, styrene butadiene rubber, chloroprene rubber, nitrile rubber, or a rubber blended of two or more of these rubbers.

As further shown, the cushion rubber layers 11 and 12 may be provided with laterally extending reinforcing fibers 14, one example of which is Stiflex 5.

The upper surface portion of the belt is defined by a plurality of fabric layers, and in the illustrated embodiment, includes three such fabric layers 15. The fabric of layers 15 is preferably a bias, or wide angle, fabric with warp and weft cotton yarns. Alternatively, the fabric may comprise an elastic fabric consisting of warp yarns of wooly-finished crimped nylon and weft yarns of nylon.

In the illustrated embodiment, the tensile cords are formed of a low-stretch, high strength material, such as a synthetic fiber. Illustratively, the tensile cords may be formed of polyester fibers, aliphatic polyamide fibers, aromatic polyamide fibers such as Kevlar, or glass fibers. As shown in FIG. 1, the tensile cords extend in laterally spaced relationship to each other, and as illustrated in FIG. 2, extend parallel to the longitudinal direction of the belts.

Belt 10 is arranged to define a cogged belt construction wherein the lower layer is arranged to define a plurality of longitudinally spaced, transversely extending cogs 16. As shown in FIG. 2, the cogs are equally longitudinally spaced. Thus, the cogs effectively define the compression section generally designated 17 of the belt. As shown, the compression section defining the cogs is defined by a plurality of rubber layers 18 having embedded therein one or more layers 19 of reinforcing fabric cords wherein the cords extend transversely to the longitudinal extent of the belt and wherein the layers extend serpentinely in the longitudinal direction, as seen in FIG. 2. The cords, in the illustrated embodiment, are formed of suitable reinforcing fiber material, such as cotton, polyester fiber, aliphatic polyamide fiber, aromatic polyamide fibers, glass fibers, etc.

Figure 2:
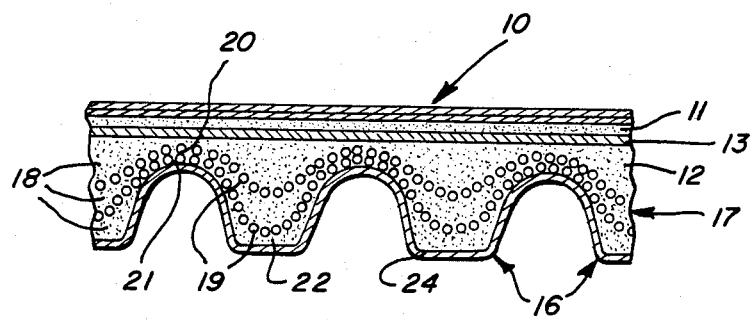
FIG. 2 is a fragmentary longitudinal section thereof.

As further illustrated in FIG. 2, the two illustrated layers 19 of the reinforcing fabric of the compression section may be effectively in contact with each other as at the position 20 adjacent the valley portion 21 of the cog 16. However, as further shown in FIG. 2, the fabric layers 19 are substantially separated in the peak portion 22 of the cog so as to provide uniform distribution of the reinforcement of the cogs in the resistance to lateral pressure during use of the belt. By effectively spacing the layers in the peck portions 22, peeling of the cord layers, as by inflection of the belt portion, is effectively avoided. Thus, improved, long troublefree life of the belt is provided.

As will be obvious to those skilled in the art, the two-layer configuration of the illustrated embodiment is exemplary only. Thus, any number of layers may be provided within the scope of the invention as desired.

In addition to the reinforcing cords 19, rigidity of the compression section 17 is provided by the inclusion of transverse short reinforcing fibers 23, illustratively in the illustrated embodiment comprising Stiflex 5, in the rubber cushion portions 18 of the compression section.

As further shown in FIGS. 1 and 2, the inner surface of the cogs may be covered with a suitable fabric 24 to provide further improved rigidity of the cogs. Fabric 24 illustratively comprises a bias fabric, a wide angle fabric with warp and weft yarns disposed at an angle between 80° and 150° to each other, or an elastic fabric with warp yarns of crimped wooly nylon.

The transverse reinforcing cords 19 of the compression section are advantageously arranged to extend at an angle of between 0° to 30° to the perpendicular of the longitudinal axis of the belt so as to be effectively bias-laid. Where a plurality of layers is utilized, the alternating layers are preferably oppositely biased.

As will be obvious to those skilled in the art, the utilization of the reinforcing cords and the transverse short fibers, such as Stiflex 5 fibers, is efficacious in V-belts, as well as in cog belts, in providing improved lateral pressure resistance and inflective characteristics.

Figure 3:
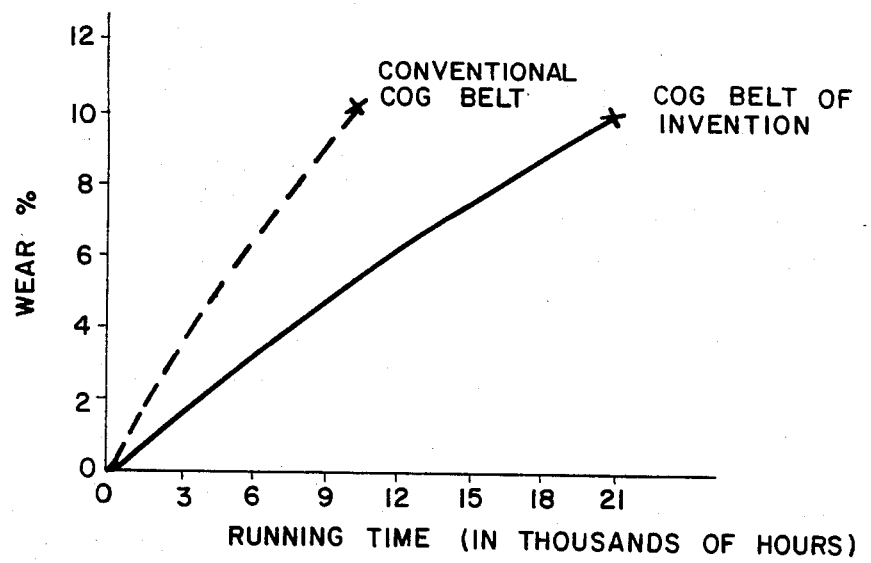
FIG. 3 is a graph comparing the wear rate of a variable belt embodying the invention with that of a conventional variable belt.

Referring to FIG. 3, the improved results obtained by the present invention are illustrated. As shown therein, the ratio of running time to the wear of the raw edge sides 25 of the belt is substantially improved in the cog belt of the invention over the conventional cog belt. More specifically, a 10% wear of the side edges 25 of the belt occurs at approximately 10,000 hours or running time with the conventional cog belt, whereas approximately 21,000 hours of running time was achieved with a cog belt of the invention before 10% wear on the side edges was reached. Thus, the cog belt of the invention offers a useful life of over twice that of the conventional belts wherein no transverse reinforcing cords 19 are employed.

In determining the results of FIG. 3, the cog belt of the invention was a belt as described above utilizing three plies of transverse cords 19 embedded in cushion rubber having Stiflex 5 fibers provided therein. The conventional cog belt was similar but did not include the fabric cords 19. The test was run in an apparatus using a drive pulley operating at 1720 rpm, a driven pulley operating at 750 rpm driving a load of 2 hp.

INDUSTRIAL APPLICABILITY

The present invention comprehends an improved raw edge, cogged variable V-belt having cogs at uniform intervals in the bottom or compression section thereof and having one or more layers of reinforcing cords extending generally transversely across the belt in the cog sections. The transverse cord layers extend longitudinally of the belt in a serpentine manner and are preferably spaced apart in the peak portion of the cogs. In combination with the transverse cords, which illustratively comprise tire cords or the like, the rubber cushion material of the compression section is provided with short reinforcing fibers.

The resultant belt construction provides improved inflective characteristics with substantially reduced side edge wear resulting from improved resistance to lateral pressure. Thus, the belts provide improved performance in a wide range of industrial applications, such as automobiles, agricultural machines, manufacturing machines, etc.

The foregoing disclosure of specific embodiments is illustrative of the broad inventive concepts comprehended by the invention.

We claim:

1. In a raw edge cogged V-belt having as a portion thereof a compression section defined by a plurality of longitudinally spaced cogs defining valley portions and peak portions being formed of rubber, the improvement comprising:

a plurality of layers of transversely extending reinforcing fabric cords in said compression section, each said layer extending serpentinely longitudinally of the belt to extend inwardly from the valley portions of the cogs into the peak portions thereof to provide an improved uniform resistance to lateral pressure in the cogs, said layers having variable spacing therebetween longitudinally of the belt so as to be closely juxtaposed at the valley portions of the cogs and substantially spaced in the peak portions thereof; and short reinforcing fibers extending transversely of said V-belt including fibers distributed between the distal ends of the peak portions of the cogs and the cord layer closest thereto.

2. The raw edge cogged V-belt of claim 1 wherein said layers at said valley portions are substantially in contact with each other.

3. The raw edge cogged V-belt of claim 1 wherein said cords are biased laid to extend at an angle from 0° to 30° to the perpendicular of the longitudinal axis of the belt.

4. The raw edge cogged V-belt of claim 1 wherein a plurality of layers of said reinforcing fabric cords is provided, the cords of every other layer being biased laid to extend at an angle from 0° to 30° to the perpendicular of the longitudinal axis of the belt, the cords of the other layers being oppositely biased laid to extend at an angle from 0° to 30° to the perpendicular of the longitudinal axis of the belt.

5. The raw edge cogged V-belt of claim 1 wherein the spacing between each pair of layers is substantially equal.

6. The raw edge cogged V-belt of claim 1 wherein said reinforcing fabric cords are formed of natural fibers.

7. The raw edge cogged V-belt of claim 1 wherein said reinforcing fabric cords are formed of synthetic resin fibers.

8. The raw edge cogged V-belt of claim 1 wherein said reinforcing fabric cords are formed of glass fibers.

* * * * *